United States Patent
Ma et al.

(10) Patent No.: US 12,260,562 B2
(45) Date of Patent: Mar. 25, 2025

(54) TRAILER END TRACKING IN A CAMERA MONITORING SYSTEM

(71) Applicant: Stoneridge, Inc., Novi, MI (US)

(72) Inventors: Liang Ma, Rochester, MI (US); Yifan Men, Northville, MI (US); Troy Otis Cooprider, White Lake, MI (US)

(73) Assignee: STONERIDGE, INC., Novi, MI (US)

( * ) Notice: Subject to any disclaimer, the term of this patent is extended or adjusted under 35 U.S.C. 154(b) by 110 days.

(21) Appl. No.: 17/952,459

(22) Filed: Sep. 26, 2022

(65) Prior Publication Data

US 2023/0125045 A1 Apr. 20, 2023

Related U.S. Application Data

(60) Provisional application No. 63/257,165, filed on Oct. 19, 2021.

(51) Int. Cl.
*G06T 7/20* (2017.01)
*B60R 1/26* (2022.01)
(Continued)

(52) U.S. Cl.
CPC .............. *G06T 7/20* (2013.01); *B60R 1/26* (2022.01); *G06T 7/70* (2017.01); *G06V 20/58* (2022.01);
(Continued)

(58) Field of Classification Search
CPC ........ B60K 35/60; B60K 35/00; B60K 35/28; B60K 35/29; B60K 2360/165; B60K 2360/176; B60K 2360/195; B60K 2360/48; B60R 11/04; B60R 1/26; B60R 2300/105; B60R 2300/8046; G09G 2340/10; G09G 5/14; G09G 5/377; G09G 2360/16;
(Continued)

(56) References Cited

U.S. PATENT DOCUMENTS 10,332,002 B2 6/2019 Bliss et al.
10,532,698 B2 1/2020 Potnis et al.
(Continued)

OTHER PUBLICATIONS

Lee By et al: "Occlusion handling in videos object tracking: A survey", IOP Conference Series: Earth and Environmental Science, [Online] vol. 18, Feb. 25, 2014 (Feb. 25, 2014), pp. 1-6, XP055782393, DOI: 10.1088/1755-1315/18/1/012020.
(Continued)

*Primary Examiner* — Farzana Hossain
(74) *Attorney, Agent, or Firm* — Carlson, Gaskey & Olds, P.C.

(57) ABSTRACT

A method for tracking a trailer end in an image using a controller includes receiving an image from at least one camera, identifying a trailer end in the image and tracking a motion of the trailer end through the image for a period of time using a controller. A motion model is generated based on the motion of the trailer end through the image using the controller. The controller responds to the trailer end exiting the image by maintaining motion of the trailer end per the motion model for a delay time period and establishing an estimated trailer end position dictated by the motion model at the end of the delay time period in response to the time period elapsing and the trailer end not being visible using the controller.

18 Claims, 6 Drawing Sheets

(51) Int. Cl.
  *G06T 7/70*    (2017.01)
  *G06V 20/58*   (2022.01)
  *H04N 7/18*    (2006.01)
  *H04N 23/90*   (2023.01)

(52) U.S. Cl.
  CPC ............. *H04N 7/181* (2013.01); *H04N 23/90* (2023.01); *B60R 2300/105* (2013.01); *B60R 2300/8046* (2013.01)

(58) Field of Classification Search
  CPC .......... G09G 2380/10; G09G 2380/12; H04N 21/2187; H04N 7/181; H04N 23/90; G06F 3/14; G06T 7/20; G06T 7/70; G06T 2207/30252; G06T 7/277; G06V 20/58
  See application file for complete search history.

(56) References Cited

U.S. PATENT DOCUMENTS

| | | | |
|---|---|---|---|
| 10,628,690 B2 | 4/2020 | Herman et al. | |
| 10,635,933 B2 | 4/2020 | Bell et al. | |
| 10,706,291 B2 | 7/2020 | Diessner et al. | |
| 10,838,054 B2 | 11/2020 | Wang et al. | |
| 11,077,795 B2 | 8/2021 | Jales Costa et al. | |
| 11,858,529 B1* | 1/2024 | Costantino | B60W 40/02 |
| 2011/0116684 A1 | 5/2011 | Coffman et al. | |
| 2014/0200759 A1 | 7/2014 | Lu et al. | |
| 2019/0337512 A1* | 11/2019 | Tahmasbi-Sarvestani | G08G 1/167 |
| 2020/0104727 A1 | 4/2020 | Kwant et al. | |
| 2020/0346581 A1 | 11/2020 | Lawson et al. | |
| 2021/0086785 A1 | 3/2021 | Niewiadomski et al. | |
| 2021/0209785 A1 | 7/2021 | Unnikrishnan et al. | |
| 2021/0221363 A1 | 7/2021 | Lai et al. | |
| 2021/0245660 A1 | 8/2021 | Lavoie et al. | |
| 2022/0250612 A1* | 8/2022 | Wang | G06V 20/58 |

OTHER PUBLICATIONS

European Search Report for European Application No. 22200158.8 mailed Mar. 21, 2023.

A. Dahal et al., "DeepTrailerAssist: Deep Learning Based Trailer Detection, Tracking and Articulation Angle Estimation on Automotive Rear-View Camera," 2019 IEEE/CVF International Conference on Computer Vision Workshop (ICCVW), 2019, pp. 2339-2346, doi: 10.1109/ICCVW.2019.00287.

Ljungqvist, Oskar, "On motion planning and control for truck and trailer systems," Jan. 1, 2019, pp. 1-99.

* cited by examiner

TRAILER END TRACKING IN A CAMERA MONITORING SYSTEM

CROSS-REFERENCE TO RELATED APPLICATION

This application claims priority to U.S. Provisional Patent Application No. 63/257,165 filed on Oct. 19, 2021.

TECHNICAL FIELD

This disclosure relates to a camera monitoring system (CMS) for use in a commercial truck, and in particular a system for locating a trailer end within a camera monitoring system image.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras to provide an enhanced field of view to a vehicle operator. In some examples, the mirror replacement systems cover a larger field of view than a conventional mirror, or include views that are not fully obtainable via a conventional mirror.

In some examples CMS displays include visual enhancements identifying road features, objects detected, or other similar overlays that assist the vehicle operator in performing vehicle operations. In some cases, the visual enhancement compensates for reduced functionality from cameras (e.g. a lack of depth perception), in other cases the visual enhancement provides improved functionality over that of traditional mirrors (e.g. object identification, distance lines and the like). Placement of some of the visual enhancements in the image requires knowledge of where one or more portions of the trailer is positioned.

SUMMARY OF THE INVENTION

An exemplary method for tracking a trailer end in an image using a controller includes receiving an image from at least one camera, identifying a trailer end in the image and tracking a motion of the trailer end through the image for a period of time using a controller, generating a motion model based on the motion of the trailer end through the image using the controller, and responding to the trailer end exiting the image by maintaining motion of the trailer end per the motion model for a delay time period and establishing an estimated trailer end position dictated by the motion model at the end of the delay time period in response to the time period elapsing and the trailer end not being visible using the controller.

In another example of the above described method for tracking a trailer end in an image using a controller generating the motion model is dependent on at least one of a vehicle speed, measured trailer angle, trailer length, steering angle, truck yaw rate, transmission gear and intrinsic and extrinsic camera sensor information.

In another example of any of the above described methods for tracking a trailer end in an image using a controller the delay time period is dependent on the at least one of the vehicle speed, measured trailer angle, trailer length, steering angle, and truck yaw rate, transmission gear and intrinsic and extrinsic camera sensor information.

In another example of any of the above described methods for tracking a trailer end in an image using a controller the delay time period is a predefined time period.

In another example of any of the above described methods for tracking a trailer end in an image using a controller the motion model is a model of a trend in motion of the trailer end through the image.

In another example of any of the above described methods for tracking a trailer end in an image using a controller the motion model is a model of a trend in motion of the trailer end through a 3D coordinate system, and the trailer end position in the 3D coordinate system is determined based at least in part on the position of the trailer end in the image.

Another example of any of the above described methods for tracking a trailer end in an image using a controller further includes providing the trailer end position to a human machine interface (HMI) module of the controller and using the HMI module to display a visual enhancement based on the estimated trailer end position.

In another example of any of the above described methods for tracking a trailer end in an image using a controller the visual enhancement includes a horizontal line extending from the trailer end position, and wherein the visual enhancement is maintained when the trailer end is out of view.

In another example of any of the above described methods for tracking a trailer end in an image using a controller further includes translating the estimated trailer end position to a three dimensional coordinate position and providing the three dimensional coordinate position to at least one of an automated driver assist system and a semi-automated driver assist system.

In another example of any of the above described methods for tracking a trailer end in an image using a controller generating the motion model comprises determining each of a constant velocity (CV), a constant acceleration (CA) and a coordinate turn constant acceleration (CTCA) of the trailer end position through the image.

In one exemplary embodiment a Camera monitoring system (CMS) for a vehicle includes at least one first camera disposed at a first side of a vehicle, the at least one first camera defining a first field of view configured to include a trailer when a trailer is connected to the vehicle, and at least one second camera disposed at a second side of the vehicle the at least one first camera defining a second field of view configured to include the trailer when the trailer is connected to the vehicle, a CMS controller communicatively coupled to each of the at least one first camera and the at least one second camera, the CMS controller being configured to generate at least one image using images from the at least one first camera and the at least one second camera, a plurality of displays, each display facing a vehicle operator position and being configured to display at least one of the at least one image, and a trailer end tracking module within the controller, the tracking module being configured to cause the controller to identify a trailer end in the images from the at least one first camera and the at least one second camera, generate a motion model based on motion of the identified trailer end through the images, and respond to the trailer end leaving one of the first field of view and the second field of view by estimating a continued trailer end position using the determined motion model.

In another example of the above described Camera monitoring system (CMS) for a vehicle estimating the continued trailer end position using the determined motion model comprises establishing a stationary estimated trailer end position in response to the trailer end not entering one of the first field of view and the second field of view within a delay time period.

In another example of any of the above described Camera monitoring systems (CMS) for a vehicle the delay time period is a predefined time period stored within the controller.

In another example of any of the above described Camera monitoring systems (CMS) for a vehicle the motion model incorporates at least one measured vehicle parameter and wherein the delay time period is dependent on the at least one measured vehicle parameter.

In another example of any of the above described Camera monitoring systems (CMS) for a vehicle the at least one measured vehicle parameter includes at least one of the vehicle speed, measured trailer angle, trailer length, steering angle, truck yaw rate, transmission gear and intrinsic and extrinsic camera sensor information.

In another example of any of the above described Camera monitoring systems (CMS) for a vehicle the controller includes human machine interface (HMI) module configured to superimpose a trailer end visual enhancement feature over the at least one mirror replacement image.

In another example of any of the above described Camera monitoring systems (CMS) for a vehicle the trailer end visual enhancement feature is a horizontal line extending from the trailer end when the trailer end is in one of the first and second fields of view and extending from the estimated trailer end position when the trailer end is not in one of the first and second fields of view.

In another example of any of the above described Camera monitoring systems (CMS) for a vehicle the first and second fields of view are Class IV fields of view.

In another example of any of the above described camera monitoring systems (CMS) for a vehicle the controller is further configured to output the estimated trailer position to an automated or semiautomated driver assist system of the vehicle.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
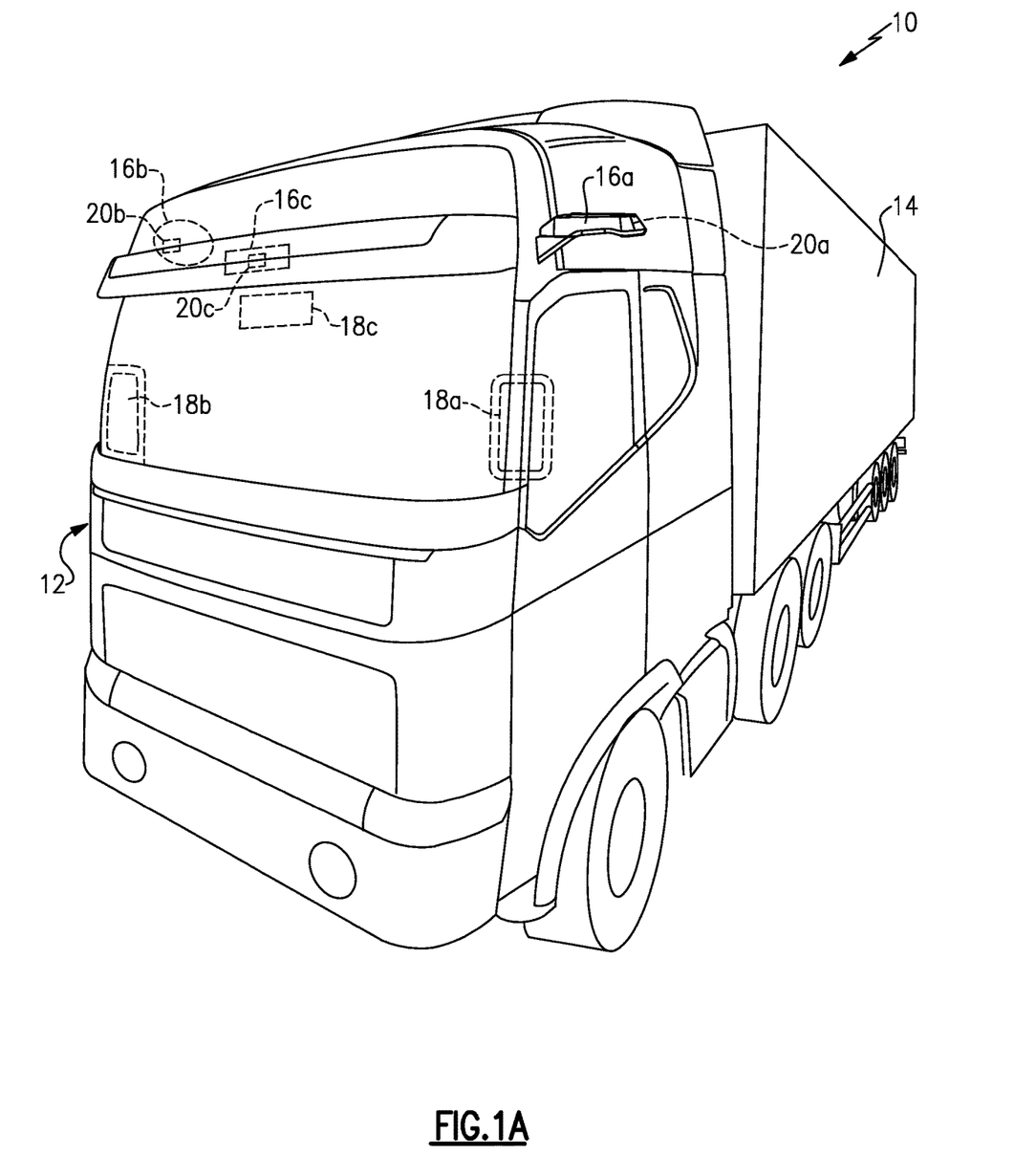
FIG. 1A is a schematic front view of a commercial truck with a camera monitoring system (CMS) used to provide at least Class II and Class IV views.
Figure 1B:
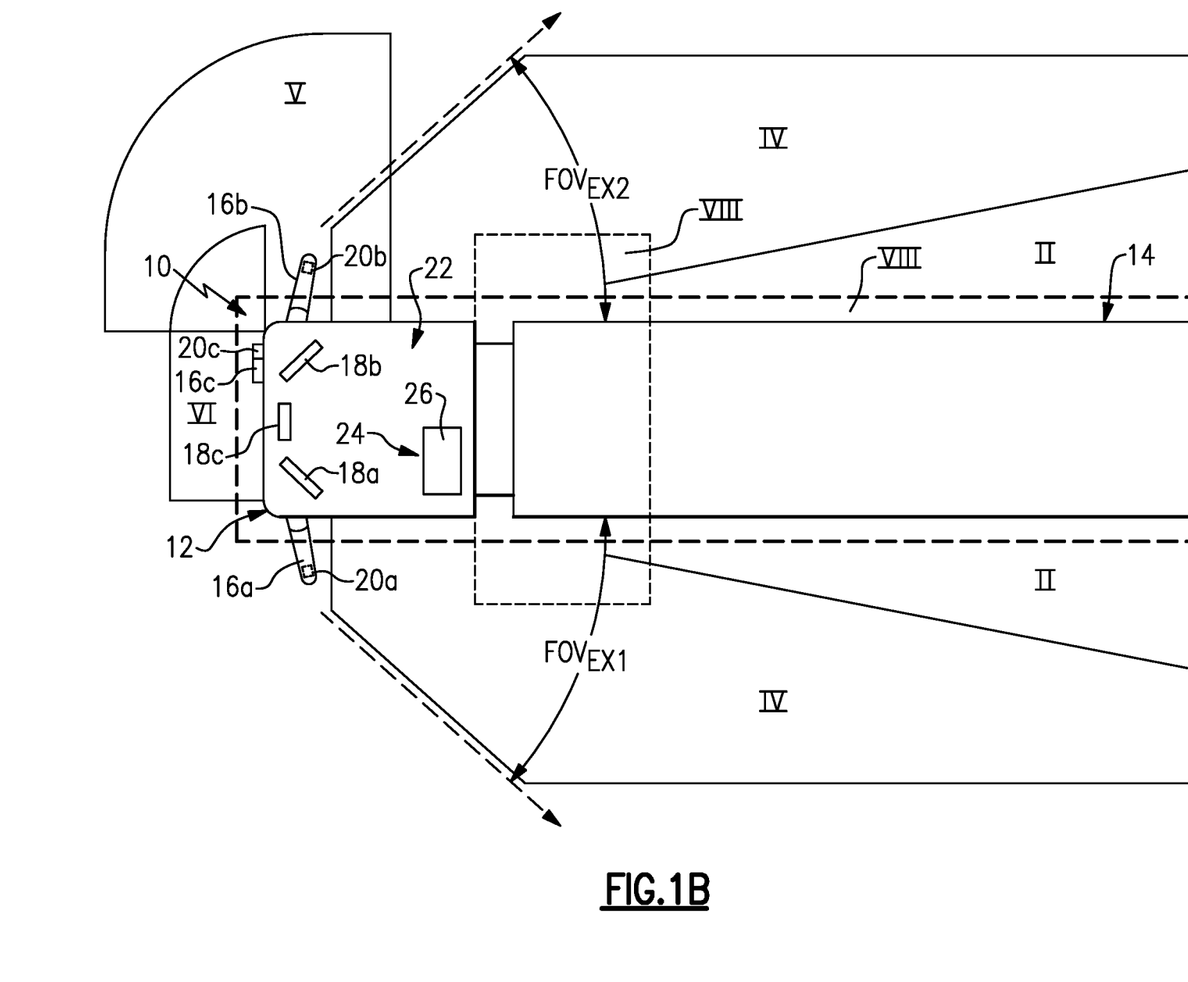
FIG. 1B is a schematic top elevational view of a commercial truck with a camera monitoring system providing Class II, Class IV, Class V and Class VI views.
Figure 2:
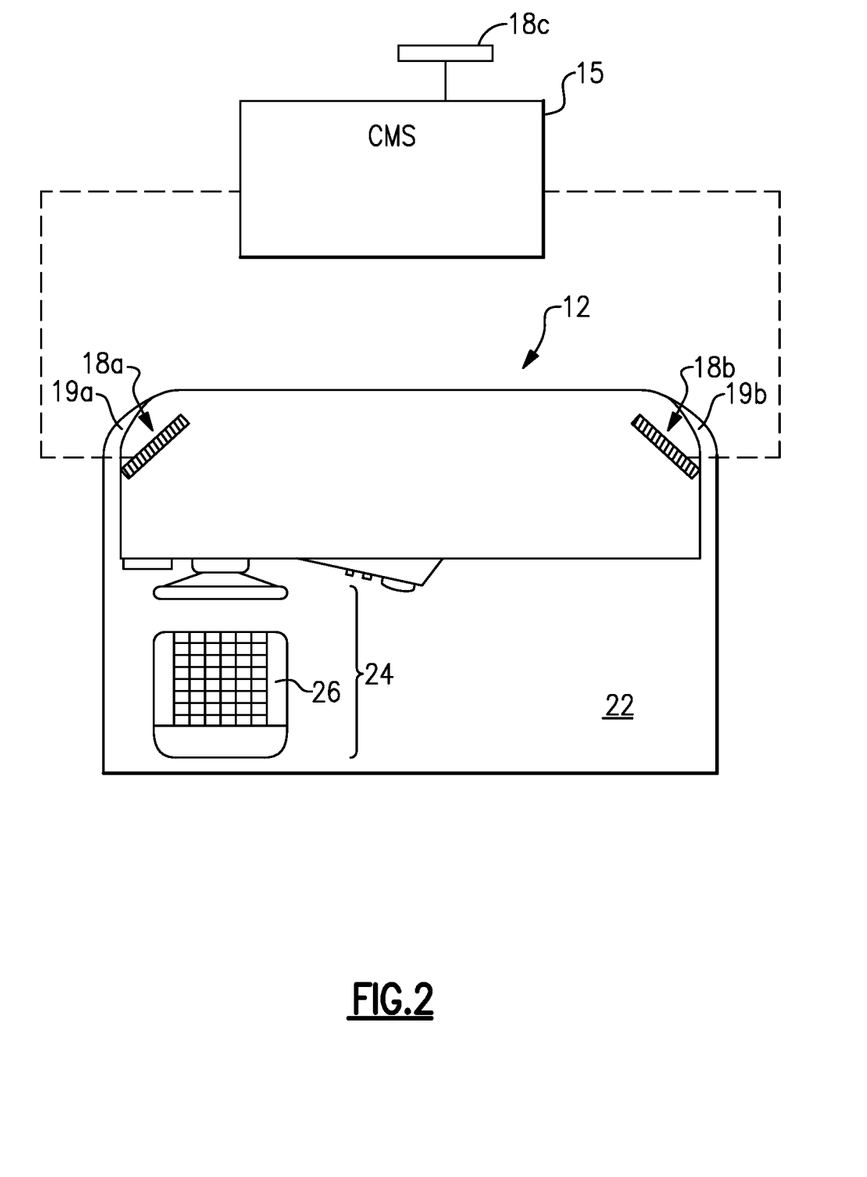
FIG. 2 is a schematic top perspective view of an vehicle cabin including displays and interior cameras.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

The displays 18a, 18b, 18c face a driver region 24 within the cabin 22 where an operator is seated on a driver seat 26. Each of the displays 18a, 18b, 18c provides a corresponding mirror replacement display. In some examples, the driver side display 18a can include a first image of a Class II view and a second image of a Class IV view each replacing the view conventionally provided by the driver side mirror. Similarly the passenger side display 18b can provide Class II and Class IV views of the passenger side of the vehicle 10. The third display 18c is further utilized in some examples to provide any supplementary views to the vehicle operator.

In some examples, the Class II and Class IV views can be enhanced by providing Human Machine Interface (HMI) overlays on top of the video feed. The HMI overlays provide additional information to the vehicle operator that may not be readily apparent from the image feed alone. Among the HMI overlays that can be used is a trailer end line superimposed over the image. The trailer end line is a horizontal line drawn from a trailer end along the y-coordinate position of the trailer end line in the display to assist the vehicle operator in identifying the relative distances from the trailer end to objects shown on the display.

To place the trailer end line, existing CMS systems rely on the vehicle operator to locate and identify the trailer end. This is achieved by the operator placing a marker within the field of view of each camera and manually adjusting a dial to move a horizontal line within the field of view until the horizontal line is aligned with the marker. Knowledge of the trailer end location can further be used to assist automated driver systems and/or partially automated driver systems. By way of example, knowledge of the rear end location can be utilized to improve the situational awareness of the driver. In alternative examples the knowledge of the rear end location could be used in conjunction with image based object detection information for threat assessment purposes. However, manually placed trailer end lines may be unreliable or may not be accurate enough to be utilized for these purposes.

Figure 3A:
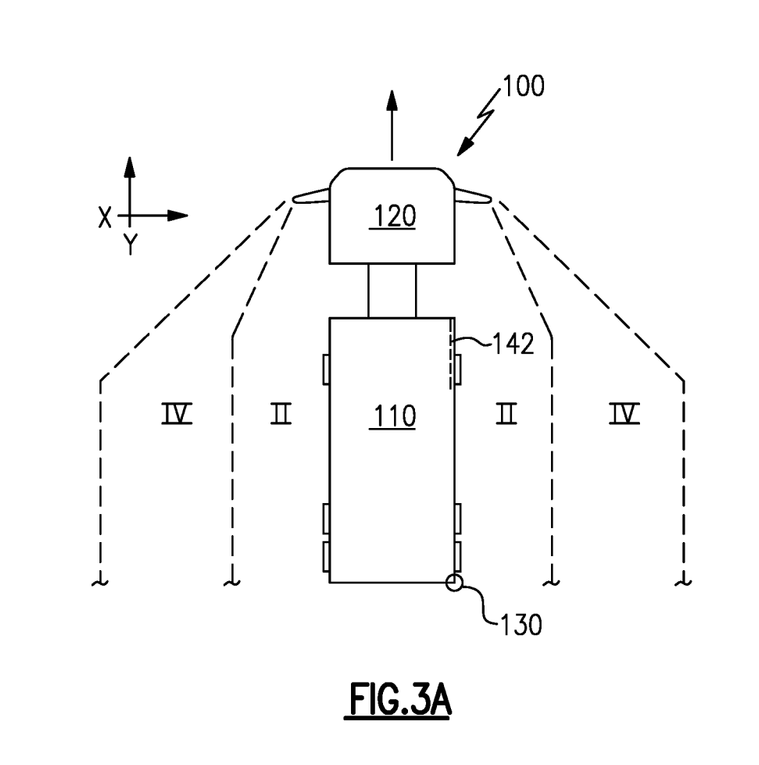
FIG. 3A schematically illustrates a commercial vehicle with a trailer angle of approximately 0 degrees.
Figure 3B:
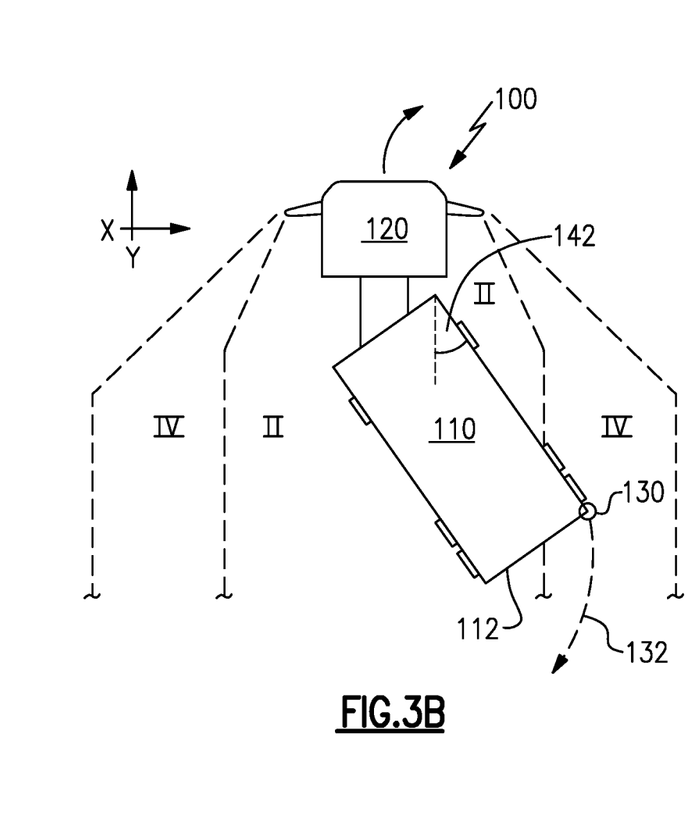
FIG. 3B schematically illustrates a commercial vehicle with a trailer angle of approximately 45 degrees.

With continued reference to FIGS. 1A, 1B and 2, FIGS. 3A and 3B illustrate a vehicle 100 including an ego part trailer 110. In FIG. 3A the vehicle 100 is in a forward moving position (FIG. 3A) where the trailer 110 has an angle of approximately zero degrees relative to the cab 120, meaning that it is aligned with the orientation of the cab 120. This angle 142 can alternatively be expressed as 180 degrees relative to the cab 120. In FIG. 3B, the vehicle 100 is turning and the trailer 110 is skewed relative the cab 120 (FIG. 3B) creating a trailer angle 142 in which the rear of the trailer 110 is visible in the Class IV view. The particular skew of FIG. 3B is exaggerated relative to most expected angles for illustrative purposes. Similar skews to those shown in FIG. 3B also occur when the vehicle 100 is performing a reverse maneuver.

In some examples, the CMS includes an HMI system that extends a trailer end line horizontally from the end of the trailer, as identified in the image. The trailer end line assists the vehicle operator in identifying the positions of objects in the field of view relative to the end 130 of the trailer 110. In further examples, the end 130 of the trailer 110 can be extrapolated into a three dimensional space position, and the extrapolated point can be used with semi-automated or automated vehicle functions, or any other vehicle systems that may require the trailer end 130 position.

During operation of the vehicle 100, the camera monitoring system (CMS) or other vehicle controller utilizes image analysis techniques to identify the end 130 of the trailer while the trailer 110 is visible in a given image, as is the case in the example of FIG. 3B. However, when the trailer end is not visible within the images, as in the example of FIG. 3A, image analysis alone cannot identify the position of the trailer end 130. In order to facilitate continued operation of the systems utilizing the trailer end position, the CMS of the vehicle 100 includes a trailer end 130 estimation module within the CMS controller that estimates the position of the trailer end 130 while the trailer end 130 is not visible.

In order to estimate the trailer end 130 position, the CMS tracks the trailer end 130 while the trailer end 130 is visible using image analysis. The tracking is, in one example, used to develop a motion model accounting for the motion of the trailer end 130 through the image. In an alternative example, the position of the trailer end 130 is converted from a 2D image location to a 3D coordinate position in a coordinate system defined by the CMS and the trailer end 130 is tracked through the 3D coordinate system. In the alternative example, estimated positions with the 3D coordinates are converted back to 2D positions for placing human machine interface (HMI) elements in the image relative to the trailer end 130. As the vehicle 100 straightens out, or turns in the other direction, the trailer angle 142 decreases and the trailer end 130 moves in an arc 132 relative to the tractor 120. This arc 132 brings the trailer end 130 out of the fields of view of the CMS cameras. In some examples, where the CMS has access to additional sensor information, the motion model can further account for data such as vehicle speed, measured trailer angle, trailer length, steering angle, truck yaw rate, transmission gear and intrinsic and extrinsic camera sensor information. The motion model of the trailer end 130 is a model of the trend in motion such that the trend can be continued When the trailer angle 142 falls below a certain threshold angle (e.g. 15 degrees), the trailer end 130 is no longer visible in the Class II or Class IV view, and the CMS cannot detect the position of the trailer end 130. As a result, a trailer end line cannot be superimposed on the image. In order to maintain a trailer end line overlay, or to maintain any other systems that rely on accurate up to date trailer end positions, the CMS uses the motion model developed while the trailer end 130 is in the Class II and Class IV fields of view to estimate the position for the trailer end 130 while the trailer end 130 is not in view.

Figure 4:
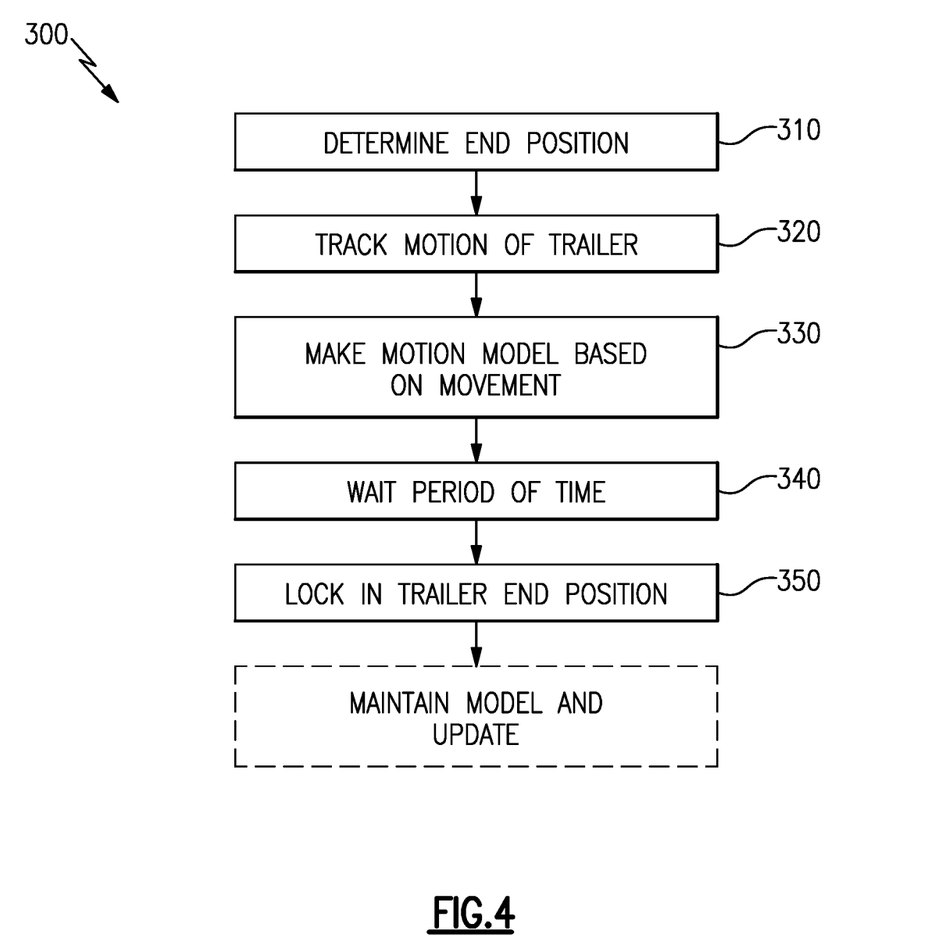
FIG. 4 illustrates a method for estimating a trailer end position while a trailer end is not visible.

With continued reference to FIGS. 3A and 3B, FIG. 4 illustrates the method 300 for maintaining the trailer end 130 position indicator (the end line). Initially the CMS identifies the trailer end 130 within one of the Class II and Class IV views using any known conventional image analysis techniques in a "Determine End Position" step 310. Once identified, the motion of the trailer end 130 is tracked through the image in a "Track Motion of Trailer" step 320. The motion tracked is the position of the trailer end 130 in the image. In some examples the motion is converted to a motion through three dimensional space and the three dimensional motion is tracked as well as the motion of the trailer end 130 through the image.

The CMS develops a motion model of the trailer based on the movement of the trailer end 130 through the image, and based on any additional factors that are known or knowable to the CMS in a "Make Motion Model Based on Movement" step 330. In one case, the motion model is a constant velocity (CV), a constant acceleration (CA) and a coordinate turn constant acceleration (CTCA). These three factors combine to describe a trend in movement of the corner through the image. In alternative examples, a single motion model, or alternative motion models can be used to provide similar functionality. By way of example, if the trailer end is moving downward through the image, at a given rate, or a given acceleration, the trend of that motion (e.g. downward at a rate of 3 pixels per second) is recorded as the motion model. The CMS assumes that the motion of the trailer end 130 will continue the trend defined in the motion model after the trailer end 130 leaves visibility. In more complex configurations, the trend defined by the motion model can include dependencies where the motion through the image is dependent on one or more additional factors such as steering angle, vehicle velocity, yawrate, transmission gear, trailer length, trailer angle rate and similar factors of the vehicle 100.

As the vehicle trailer end 130 typically leaves view as the trailer 110 is straightening (i.e. approaching a zero degree trailer angle), the CMS assumes that after a set time, the trailer will reach an equilibrium point and the trailer end 130 will have minimal movement until the vehicle 100 turns again.

When the trailer end 130 leaves the visible frame of the CMS, the CMS waits a predefined time period in a "Wait Period of Time". During the wait period, the CMS performs Kalman filtering predictions based on the motion model to continue estimating the movement of the corner during the period where the corner is not visible. The time period is sufficiently long that the CMS can be sure the trailer end 130 has reached equilibrium and will not return to visibility in the immediate future. In one example the time period can be set at approximately 2 seconds. In some examples, the time period can be dependent on the speed, yawrate, gear, trailer length, steering angle and/or any similar features of the vehicle 100, in other examples, the time period can be a static predetermined time period stored within the CMS. In the adaptive time period example, a larger Yawrate and a faster speed are indicative that the trailer is also maneuvering, so the wait time will be smaller as it is understood that the trailer end will reach the equilibrium faster.

After the time period has elapsed, if the trailer end 130 has not reappeared within the CMS view, the CMS locks in the estimated trailer end position in a "Lock In Trailer End Position" step 350. Once locked in, the trailer end 130 is assumed by the CMS to be maintained in a steady estimated position at the equilibrium based on the established motion model, and the display includes an HMI overlay such as an end line based on the assumed trailer end position. In alternative examples, the assumed trailer end 130 position can also be converted to a three dimensional position relative to the cab and provided to driver assist systems, or any other vehicle system that utilizes the trailer end 130 position.

In one example, after locking in the trailer end position 130, the position is maintained until the trailer end position 130 re-enters one of the fields of view. In alternative examples, such as those where the motion model is dependent on speed, steering angle, or any similar parameters of the vehicle 100, the motion model can be maintained after the initial time period and an estimated position of the trailer end can be updated each time the time period elapses until the trailer end 130 re-enters the frame in a "Maintain Motion Model and Update" step 360.

Figure 5A:
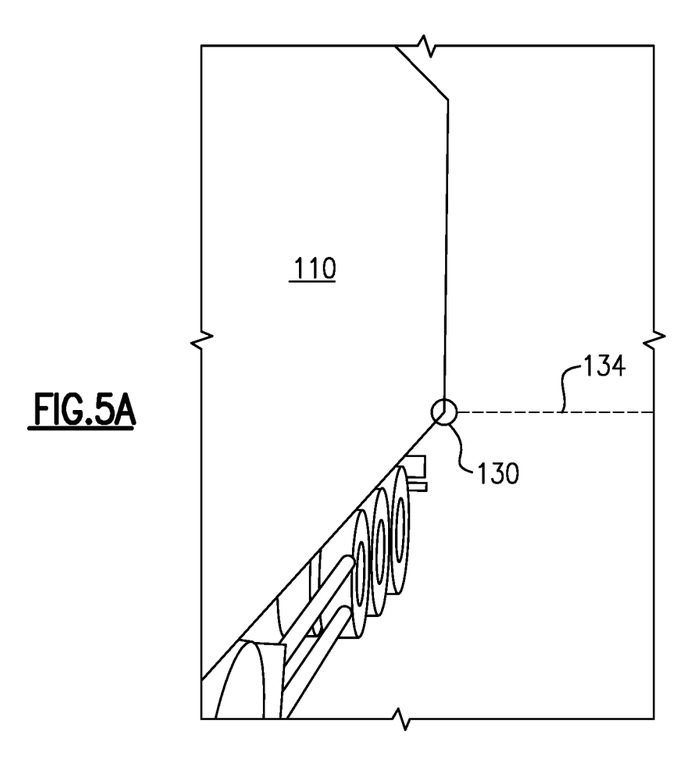
FIG. 5A schematically illustrates a Class II view with a trailer at a trailer angle such that the trailer end is visible.
Figure 5B:
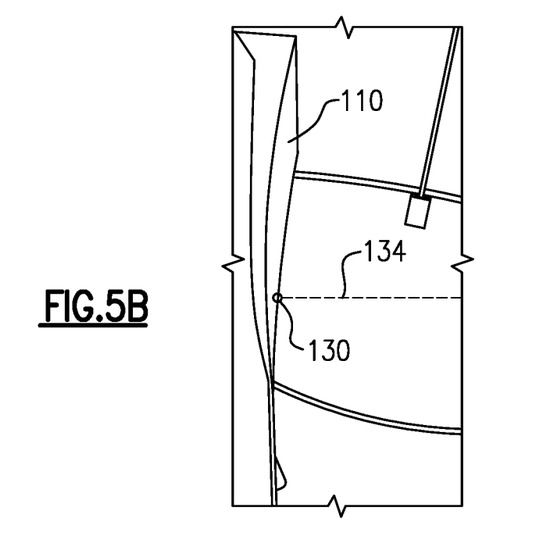
FIG. 5B schematically illustrates a Class II view with a trailer at a trailer angle such that the trailer end is not visible.

With continued reference to FIGS. 1A-4, FIGS. 5A and 5B schematically illustrate a Class II view of a trailer 110 with the trailer end 130 in view (FIG. 5A) and with the trailer end out of view (FIG. 5B). In each Figure, an exemplary trailer end line 134 human machine interface is positioned extending horizontally from the end 130, or assumed end, of the trailer 110.

Although an example embodiment has been disclosed, a worker of ordinary skill in this art would recognize that certain modifications would come within the scope of the claims. For that reason, the following claims should be studied to determine their true scope and content.

What is claimed is:

1. A method for tracking a trailer end in an image using a controller comprising:
   receiving an image from at least one camera;
   identifying a trailer end in the image and tracking a motion of the trailer end through the image for a period of time using a controller;
   generating a motion model based on the motion of the trailer end through the image using the controller; and
   responding to the trailer end exiting the image by maintaining motion of the trailer end per the motion model for a delay time period and establishing an estimated trailer end position dictated by the motion model at the end of the delay time period in response to the time period elapsing and the trailer end not being visible using the controller.

2. The method of claim 1, wherein generating the motion model is dependent on at least one of a vehicle speed, measured trailer angle, trailer length, steering angle, truck yaw rate, transmission gear and intrinsic and extrinsic camera sensor information.

3. The method of claim 2, wherein the delay time period is dependent on the at least one of the vehicle speed, measured trailer angle, trailer length, steering angle, and truck yaw rate, transmission gear and intrinsic and extrinsic camera sensor information.

4. The method of claim 1, wherein the delay time period is a predefined time period.

5. The method of claim 1, wherein the motion model is a model of a trend in motion of the trailer end through the image.

6. The method of claim 1, wherein the motion model is a model of a trend in motion of the trailer end through a 3D coordinate system, and the trailer end position in the 3D coordinate system is determined based at least in part on the position of the trailer end in the image.

7. The method of claim 1, further comprising providing the trailer end position to a human machine interface (HMI) module of the controller and using the HMI module to display a visual enhancement based on the estimated trailer end position.

8. A method for tracking a trailer end in an image using a controller comprising:
   receiving an image from at least one camera;
   identifying a trailer end in the image and tracking a motion of the trailer end through the image for a period of time using a controller;
   generating a motion model based on the motion of the trailer end through the image using the controller;
   responding to the trailer end exiting the image by maintaining motion of the trailer end per the motion model for a delay time period and establishing an estimated trailer end position dictated by the motion model at the end of the delay time period in response to the time period elapsing and the trailer end not being visible using the controller; and
   providing the trailer end position to a human machine interface (HMI) module of the controller and using the HMI module to display a visual enhancement based on the estimated trailer end position, wherein the visual enhancement includes a horizontal line extending from the trailer end position, and wherein the visual enhancement is maintained when the trailer end is out of view.

9. The method of claim 1, further comprising translating the estimated trailer end position to a three dimensional coordinate position and providing the three dimensional coordinate position to at least one of an automated driver assist system and a semi-automated driver assist system.

10. The method of claim 1, wherein generating the motion model comprises determining each of a constant velocity (CV), a constant acceleration (CA) and a coordinate turn constant acceleration (CTCA) of the trailer end position through the image.

11. A Camera monitoring system (CMS) for a vehicle comprising:
- at least one first camera disposed at a first side of a vehicle, the at least one first camera defining a first field of view configured to include a trailer when a trailer is connected to the vehicle, and at least one second camera disposed at a second side of the vehicle the at least one second camera defining a second field of view configured to include the trailer when the trailer is connected to the vehicle;
- a CMS controller communicatively coupled to each of the at least one first camera and the at least one second camera, the CMS controller being configured to generate at least one image using images from the at least one first camera and the at least one second camera;
- a plurality of displays, each display facing a vehicle operator position and being configured to display at least one of the at least one image; and
- a trailer end tracking module within the controller, the tracking module being configured to cause the controller to identify a trailer end in the images from the at least one first camera and the at least one second camera, generate a motion model based on motion of the identified trailer end through the images, and respond to the trailer end leaving one of the first field of view and the second field of view by estimating a continued trailer end position using the determined motion model, wherein estimating the continued trailer end position using the determined motion model comprises establishing a stationary estimated trailer end position in response to the trailer end not entering one of the first field of view and the second field of view within a delay time period.

12. The CMS of claim 11, wherein the delay time period is a predefined time period stored within the controller.

13. The CMS of claim 11, wherein the motion model incorporates at least one measured vehicle parameter and wherein the delay time period is dependent on the at least one measured vehicle parameter.

14. The CMS of claim 13, wherein the at least one measured vehicle parameter includes at least one of the vehicle speed, measured trailer angle, trailer length, steering angle, truck yaw rate, transmission gear and intrinsic and extrinsic camera sensor information.

15. The CMS of claim 11, wherein the controller includes human machine interface (HMI) module configured to superimpose a trailer end visual enhancement feature over the at least one image.

16. The CMS of claim 15, wherein the trailer end visual enhancement feature is a horizontal line extending from the trailer end when the trailer end is in one of the first and second fields of view and extending from the estimated trailer end position when the trailer end is not in one of the first and second fields of view.

17. The CMS of claim 15, wherein the first and second fields of view are Class IV fields of view.

18. The CMS of claim 11, wherein the controller is further configured to output the estimated trailer position to an automated or semiautomated driver assist system of the vehicle.

* * * * *